Oct. 25, 1960  W. B. FORD II, ET AL  2,957,725
VEHICLE BODY WITH SEPARATELY RETRACTIBLE TOP AND REAR WINDOW
Original Filed June 19, 1952  6 Sheets-Sheet 6

INVENTORS
WALTER B. FORD II
AUGUST KELLER
BY Whittemore,
Hulbert & Belknap
ATTORNEYS

United States Patent Office 2,957,725
Patented Oct. 25, 1960

2,957,725

VEHICLE BODY WITH SEPARATELY RETRACTIBLE TOP AND REAR WINDOW

Walter B. Ford II, Grosse Pointe Farms, and August Keller, Dearborn, Mich., assignors to Dura Corporation, a corporation of Michigan Continuation of application Ser. No. 294,328, June 19, 1952. This application Mar. 16, 1956, Ser. No. 574,059

24 Claims. (Cl. 296—107)

The present invention relates to a vehicle convertible top, and more particularly to a hard or rigid top adapted to be moved as a unit longitudinally of the vehicle between a forward closed position and a rearward open position, in which latter position the top overlies the rear deck of the vehicle. This application is a continuation of our application Serial No. 294,328, filed June 19, 1952, now abandoned.

It is an object of the present invention to provide a hard top convertible including a rear window structure movable between raised and lowered positions in conjunction wtih a rigid top movable longitudinally of the vehicle from a forward closed position to a rearward open position, movement to open position being possible only when the rear window structure is in lowered position.

It is a further object of the present invention to provide a hard top convertible including rear quarter members adjacent the rear corners of the passenger compartment movable between raised and lowered positions, a rear window structure movable between raised and lowered positions, and a rigid or hard top movable as a unit longitudinally of the vehicle from a forward closed position to a rearward open position.

It is a further object of the present invention to provide movable rear quarter members adjacent the rear corners of the compartment in combination with a longitudinally movable rigid top, and means interconnecting said quarter members and top to effect guiding movement of the top during its intermediate movement.

It is a further object of the present invention to provide a pair of levers adjacent the rear corners of the passenger compartment, means mounting the levers for rocking movement between a raised position and a lowered position in which the levers are substantially received within the body of the vehicle, a rigid top, guide means interconnecting the edges of the top from its forward closed position to an intermediate partly open position, said means providing a connection between the free ends of said levers and the front edge of said top whereby when said levers are swung to lowered position the front edge of said top is swung consecutively upwardly, rearwardly and downwardly to a position adjacent the rear edge of the passenger compartment.

It is a further object of the present invention to provide a vehicle having a passenger compartment and a rear deck in conjunction with a rigid top movable from a forward closed position to a rearward open position in which the rear end of said top is movable along the upper surface of said rear deck.

It is a further object of the present invention to provide in a vehicle of the character described, a pair of hinged levers adjacent the rear corners of the passenger compartment, a rear window structure movable between raised and lowered positions, means mounting the top structure for such movement comprising a trackway including track sections carried by said levers and additional track sections fixedly mounted within the body of the vehicle.

It is a further object of the present invention to provide in structure of the character described in the preceding paragraph, roller means on the window structure including at least three rollers at each side of the window structure to provide adequate support for the window structure as some of said rollers cross the gap between said track sections.

It is a further object of the present invention to provide in a convertible vehicle having a passenger compartment provided with front and rear seats, a rigid top movable from a forward closed position in which its forward edge is adjacent the wind-shield of the vehicle to a rear open position in which its forward edge is adjacent the rear edge of the passenger compartment, in conjunction with means providing for forward movement of said top from its rear open position to a position in which the front edge of said top is adjacent the rear top edge of the front seat of the vehicle to thereby provide a top closure for the portion of the passenger compartment rearward of the front seat thereof.

Other objects and features of the invention will become apparent as the description proceeds, especially when taken in conjunction with the accompanying drawings, wherein.

Referring now to the drawings, the invention relates to a vehicle herein illustrated as comprising a body 10 provided with a door 12, a windshield 14 including a top windshield header bar 16, a movable wing 18, a vertically movable window 20, and a quarter window 22 movable between raised and lowered positions and mounted for swinging movement between such positions. The body 10 of the vehicle is provided with a passenger compartment and extending rearwardly from the passenger compartment is a rear deck 26.

As is conventional in automotive vehicles of the character described, the windshield is rigidly supported in a frame including the top header bar, and closure means including the wing 18 and windows 20 and 22 extend upwardly above the sides of the passenger compartment and rearwardly from the windshield. To provide a completely enclosed passenger compartment the structure includes a top 28, a rear window structure 30, and rear quarter panel structure 32 which also serves as levers as will subsequently be described.

Figures 1, 19:
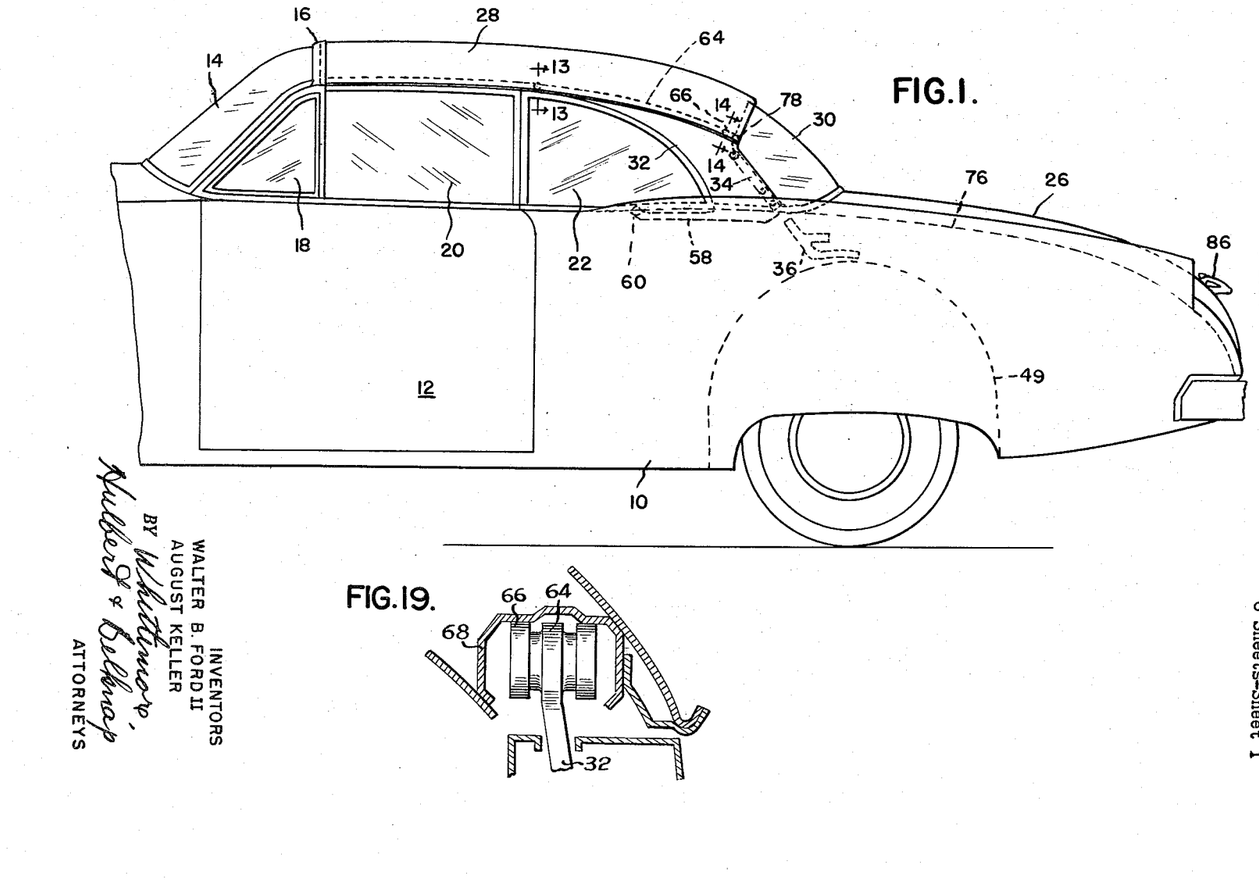
Figure 1 is a fragmentary side elevation of a vehicle embodying the present invention.
Figure 19 is a sectional detail of the track taken on the line 19—19 of Figure 6.
Figures 7, 8:
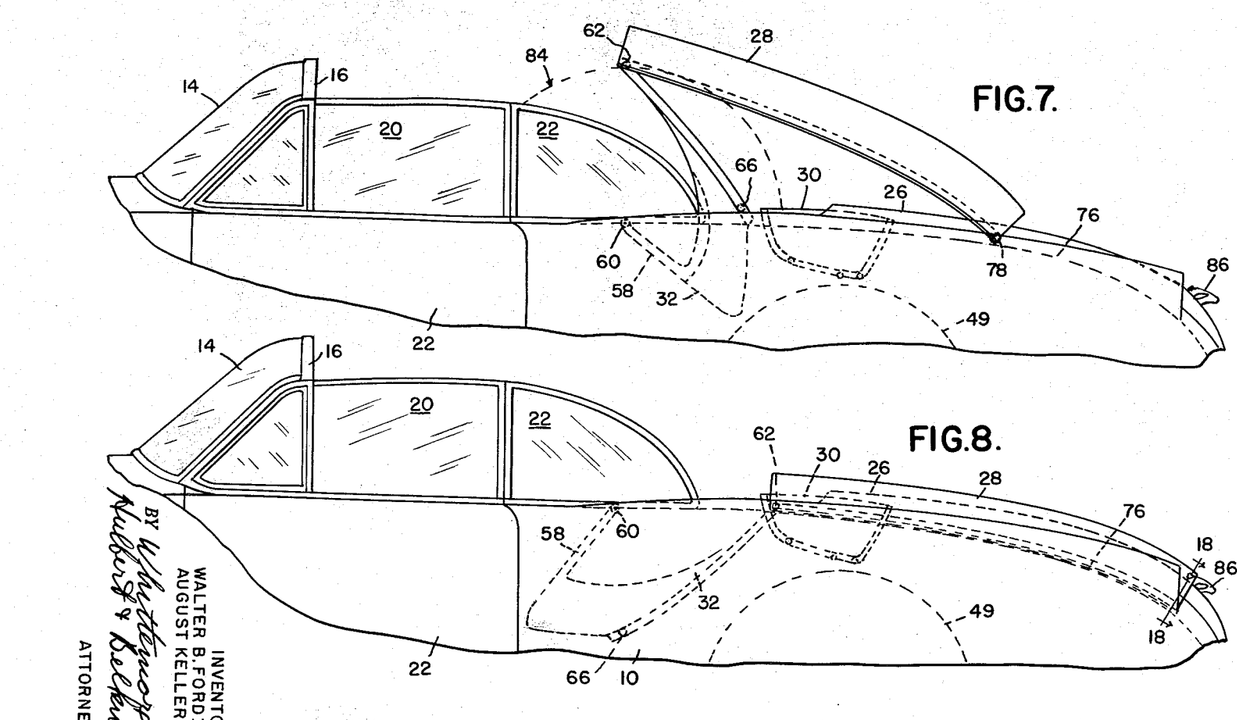
Figure 7 is a fragmentary side elevation of the vehicle showing the top in an intermediate position with its forward edge in process of being swung rearwardly to full open position.
Figure 8 is a fragmentary side elevation of the vehicle showing the top in its rearmost fully open position.

In general terms, the enclosed vehicle as illustrated in Figure 1 is converted to the open vehicle illustrated in Figure 8 by movement of the window structure 30 to a position within the body of the vehicle, rearward sliding movement of the top 28, and swinging movement of the rear quarter panels 32 to concealed position within the vehicle. Swinging movement of the rear quarter panels or levers 32 to closed position takes place at a time when the front edge of the top 28 is pivotally connected to the front or forward end of the levers 32 and accordingly the front edge of the rigid top completes its movement to full open position by movement through an arc as determined by the pivot axis of the levers 32.

In the closed position illustrated in Figure 1 the rigid top 28 is connected to and sealed with the top header bar 16 of the windshield 14 by suitable means such for example as those illustrated in Votypka Patent 2,580,336. In order to move the top from its forward position to its rearward position it is necessary first to move the rear window structure 30 to lowered position to get it out of the way of the top. This is accomplished, as best illustrated in Figures 1, 4, 10, 11, 12, 15 and 16, by mounting the rear window structure in trackways provided at opposite sides of the vehicle. Specifically, these trackways comprise track sections 34 provided on the levers 32 and movable therewith. Within the body of the vehicle there are provided additional track sections 36 which are in alignment with the track sections 34 when the levers 32 are in raised position. In order to provide for movement of the levers 32 from raised to lowered position, it is necessary for the adjacent ends of the track sections 34 and 36 to be substantially spaced as well illustrated in Figures 10–12. This in turn calls for the provision of three pairs of rollers 38, 40 and 42 on the rear window structure 30 so that the rear window structure may be adequately supported while one of the rollers 38, 40 or 42 is bridging the gap between the track sections 34 and 36. The track section 36 includes a main portion 44 and a short branch portion 46 for a purpose which will now be described.

Figures 9, 10, 11, 12:
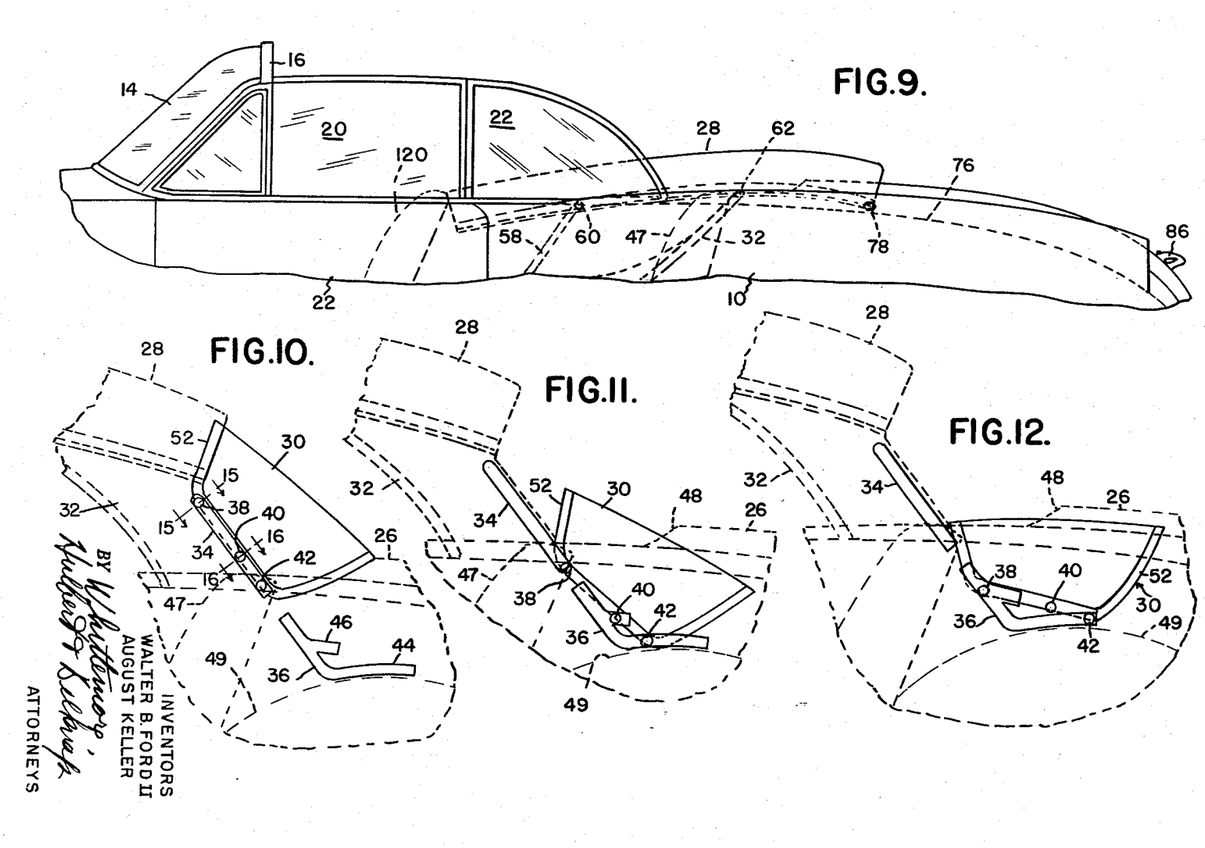
Figure 9 is a fragmentary side elevation showing the top moved forwardly from its fully open position to an intermediate position in which it is adapted to cover the space of the passenger compartment rearward of the front seat thereof.
Figure 10 is an enlarged side elevational view showing the rear window section and the support means therefor.
Figure 11 is an enlarged fragmentary side elevation showing the rear window structure in a partly lowered position.
Figure 12 is an enlarged fragmentary side elevation showing the top in its fully lowered position.

It will be appreciated that when the rear window structure is moved downwardly to the right as seen in Figure 10 toward the position illustrated in Figure 11, the roller 42 will pass out of the track section 34. During this interval the rear window structure 30 is adequately supported by the rollers 38 and 40 which remain in the track section 34. The rollers 42 then enter the track section 36 and the rollers 38 and 42 provide adequate support for the rear window section while the rollers 40 are intermediate the track sections. Finally, the intermediate roller 40 is caused to enter the short branch portion as the roller 42 follows the main track portion 44. When the upper roller 38 is intermediate the track sections the rear window structure 30 is adequately supported by the rollers 40 and 42 as is evident from an inspection of Figure 11. In its fully lowered position, as illustrated in Figure 12, the rear window structure 30 is supported by its rollers 42 and 38. Upon movement of the window structure 30 from the open position illustrated in Figure 12 to the closed position illustrated in Figure 10, the action of the rollers and track sections is of course reversed. It will be appreciated that with the window in its lowered position, as illustrated in Figure 12, it is entirely out of engagement with the lever 32 whereby the lever may be swung from the raised position illustrated in Figures 10–12 to its lowered position illustrated in Figure 8.

As is apparent from an inspection of Figures 10–12 the body of the vehicle is constructed to provide a space intermediate the back of the rear seat 47 and the front edge 48 of the rear deck 26. The movement of the rear window structure 30 from the closed position illustrated in Figure 10 to the open position illustrated in Figure 12 is limited by the presence of the wheel housing 49. Accordingly, the track section 36 is located within the body of the vehicle in a position determined in part by the wheel housing 49 and is so constructed and arranged to provide for movement of the rear window structure 30 to the fully open position shown in Figure 12 without interference with either the rear seat 47 or the rear deck 26 of the vehicle.

It will of course be understood that the rear window structure is transversely curved and that its edge portions are located outwardly from the top corners of the rear seat. The locations of the rear window structure in relation to the rear seat in successive lowered positions is clearly shown in Figures 10, 11 and 12. It will further be understood that when the rear window structure is housed beneath the rear deck, as shown in Figure 12, it does not take up any appreciable useful space within the luggage compartment located under the rear deck.

Figures 2, 3, 4:
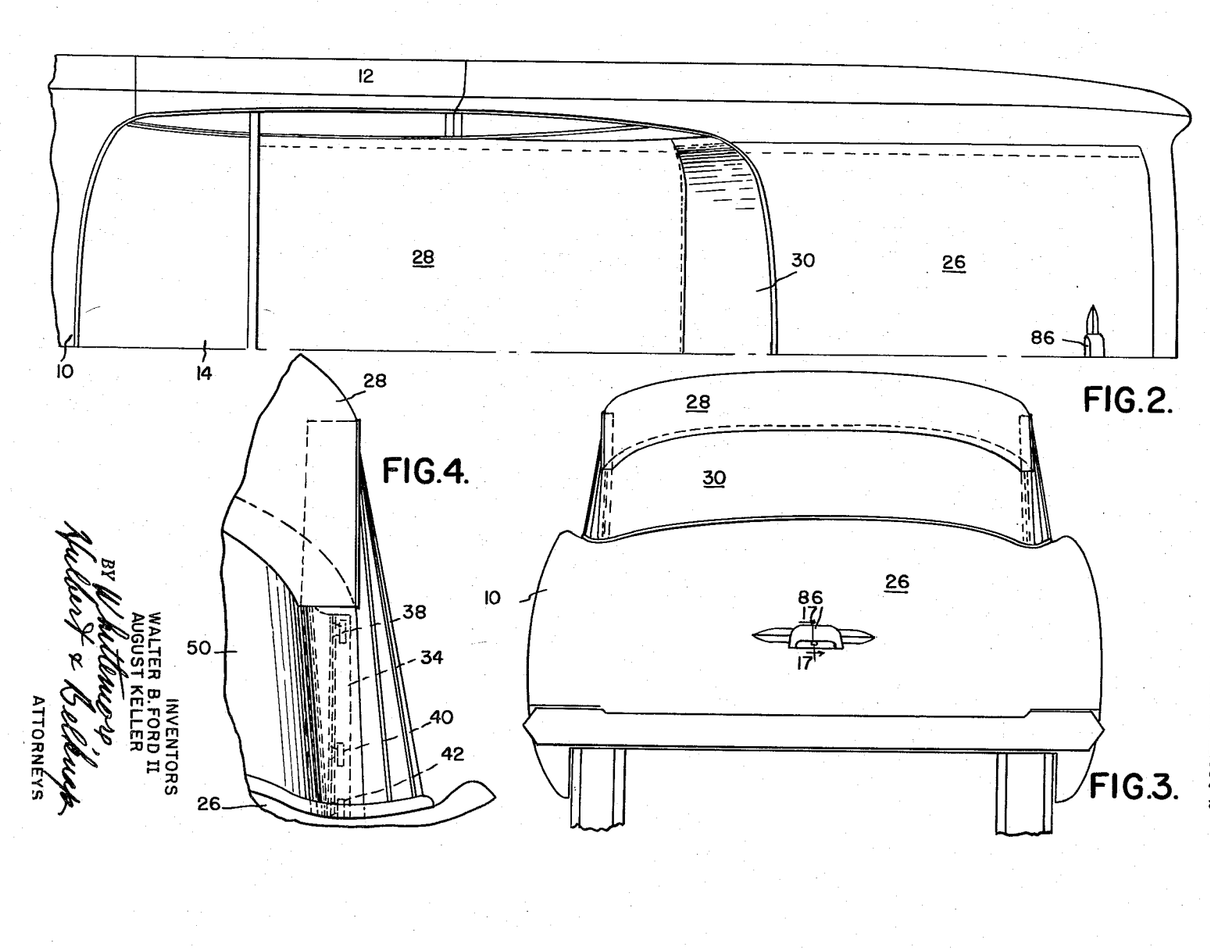
Figure 2 is a fragmentary plan view of the vehicle.
Figure 3 is a fragmentary rear view of the vehicle.
Figure 4 is a fragmentary enlarged rear elevational view illustrating the manner of mounting the rear window structure.
Figure 5:
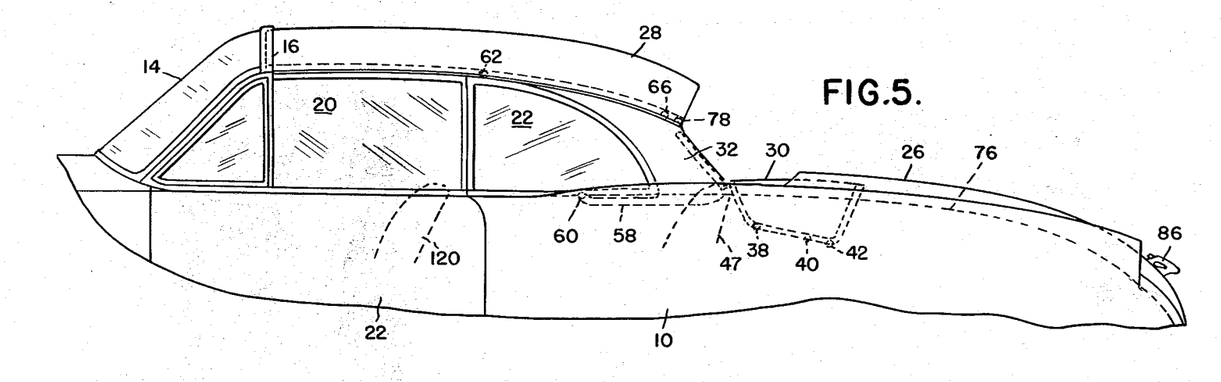
Figure 5 is a fragmentary side elevational view showing the rear window structure moved to lowered position.

As best illustrated in Figure 2, it is desirable for the rear window structure to have an upward and inward taper. This calls for a special construction, best illustrated in Figures 4, 15 and 16. In order to accomplish this, and at the same time permit movement of the rear window structure along parallel trackways, the rear window structure comprises the window glass 50 mounted in a frame 52, the frame including outwardly extending web portions 54 and terminating in a doubled flange 56 which occupies a vertical plane parallel to the track sections 34. Inasmuch as the window is narrower at its top than at its bottom the width of the web 54 varies as illustrated in Figure 4 and as well illustrated in Figures 15 and 16. By virtue of this construction the rear window which is wider at its bottom than at its top is provided with rollers 38, 40 and 42 all of which occupy a vertical plane and are therefore movable along rectilinear trackways 34.

Figure 6:
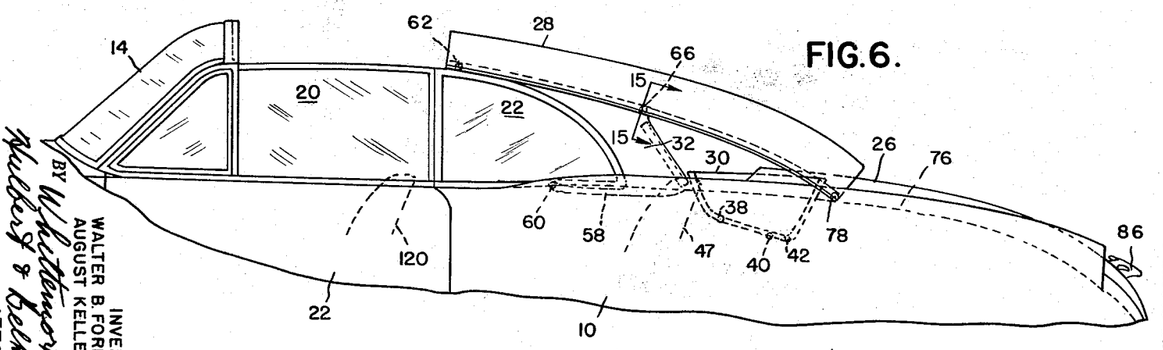
Figure 6 is a fragmentary side elevation of the vehicle showing the rigid top moved rearward to an intermediate position.
Figure 13:
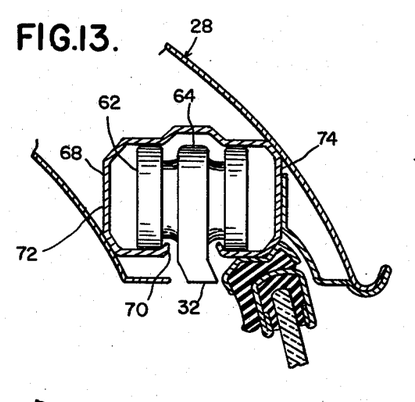
Figure 13 is an enlarged fragmentary section on the line 13—13, Figure 1.
Figures 14, 16:
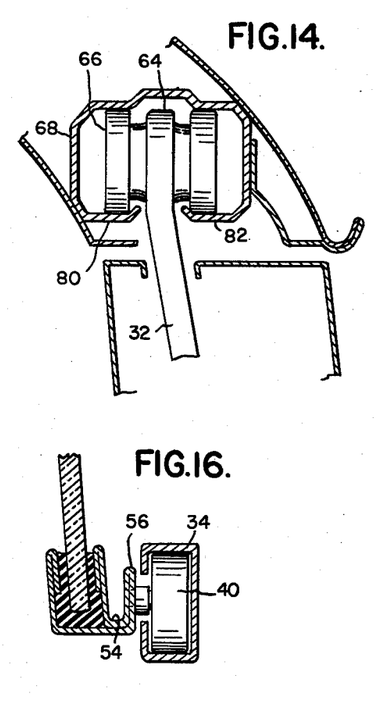
Figure 14 is an enlarged fragmentary sectional view on the line 14—14, Figure 1.
Figure 16 is an enlarged fragmentary sectional view on the line 16—16, Figure 10.
Figure 15:
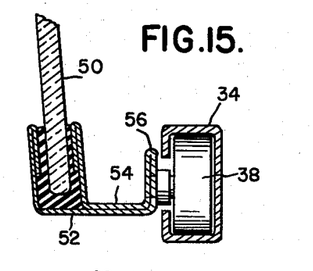
Figure 15 is an enlarged fragmentary sectional view on the line 15—15, Figure 10.

When the rear window structure 30 has been moved to its lowered position illustrated in Figure 12, it is then possible to move the top 28 rearwardly. This is accomplished by releasing the latch means (not shown) which serves to connect the front of the top to the windshield header bar, and thereafter the top moves rearwardly as a unit. In order to guide and support the top during this rearward movement, means are provided at the edges of the top and on the levers 32. This means is best illustrated in Figures 1, 13 and 14. As seen in these figures, the levers 32 include forwardly extending arms 58 which are secured to fixed pivots 60 located within the body of the vehicle. The arms 58 include laterally enlarged rear quarter portions adapted to close the space between the quarter windows 22 and the rear window structure 30. The levers 32 extend forwardly to approximately the junction above the forward edge of the window 22 and a rear edge of the window 20 and are there provided with a pair of rollers 62. Adjacent the rear end of the top edge 64 of the levers 32 there are provided rollers 66. The rigid top 28 as best illustrated in Figures 13 and 14, is provided with an enclosed track 68 having a slot 70 at its bottom through which portions of the lever 32 may extend. The track 68 includes lateral portions 72 and 74 which receive and interlock with the rollers 62 and 66. As a result of this construction the top structure 28 is adequately supported by the widely spaced rollers 62 and 66 during its rearward movement and while its forward edge is unsupported. The edges of the top 28 and the tracks 68 are curved as best illustrated in Figure 1, and cooperate with the rollers 62 and 66 such that the top moves rearwardly in guided relation on the top edges 64 of the levers 32 in an arcuate path. Continued rearward movement of the top 28 eventually brings the parts to the position illustrated in Figure 6, at which time it will be observed that the front edge of the top 28 is adjacent the forward roller 62 on the lever 32 and the rear edge of the top 28 engages the rear deck of the vehicle. Specifically, the rear deck of the vehicle is provided with trackways 76 and adjacent the rear corners of the top 28 there are provided rollers 78 which may be formed of a soft material designed to cooperate with the trackways 76. In Figure 6 the parts are illustrated in the position in which the rollers 78 have just engaged the trackway 76.

The enclosed tracks 68 at the edges of the top are provided with gates (Figure 19) formed by omitting short portions of the bottom flanges 80 and 82 of the track 68. With the parts in the position illustrated in Figure 6, the levers 32 are swung in clockwise direction and the rollers 66 escape from the tracks 68. The forward rollers 62 move in an arc, a portion of which is illustrated at 84 in Figure 7. At this time the roller 62 serves as a pivot connection between the forward edge of the top 28 and the lever arm 32. Swinging movement of the lever arm 32 results sequentially in upward, rearward, and then downward swinging movement of the roller 62, thus moving the forward edge of the top 28 along the arc 84. This guided movement of the forward edge of the top 28 is accompanied by rearward movement of the rear end of the top 28 and rolling movement of the rollers 78 along the trackways 76. Eventually, swinging movement of the levers 32 is terminated with the levers in the position illustrated in Figure 8. At this time it will be observed that the rollers 62 are in such position that the forward edge of the top 28 is substantially at the rear edge of the passenger compartment and the rear edge of the top 28 is adjacent the rear of the deck of the vehicle.

Figure 17:
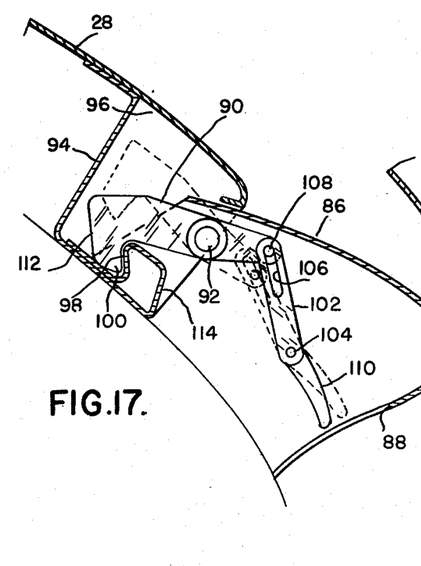
Figure 17 is an enlarged sectional view on the line 17—17, Figure 3.
Figure 18:
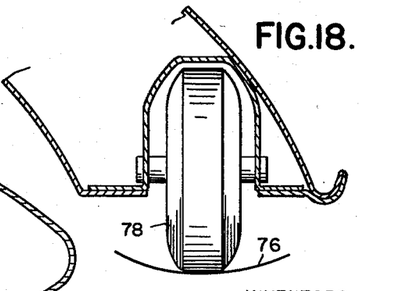
Figure 18 is an enlarged sectional view on the line 18—18, Figure 8.

The top 28 is latched in position by a mechanism illustrated in Figure 17 which is provided on the rear deck of the vehicle. The latch mechanism includes a latch housing 86 having a finger opening 88 therein and carrying a latching dog 90 which is pivoted on a pin 92. The rear end of the top 28 is provided with a plate 94 defining a housing 96, the plate 94 being reversely turned as indicated at 98, to cooperate with the hooked nose 100 of the latch lever 90. The latch lever 90 will normally be biased toward latching position by a spring (not shown). A latch release lever 102 is provided in the housing 86 and is pivoted on a pin 104. The latch release lever 102 includes an elongated slot 106 which receives a pin 108 carried at the end of the latch lever 90, and the latch release lever 102 also includes a finger portion 110 which the operator may press to release the latch lever 90. It will be observed that the latch lever 90 includes a camming surface 112 which cooperates with a correspondingly inclined camming surface 114 at the rear edge of the top 28 so that the top automatically latches as it is moved into egnagement with the latch lever 90.

It will be appreciated that in order to enclose the passenger compartment a reverse of the preceding operation is carried out. Thus, latch release lever 102 is actuated, levers 32 are swung in a counterclockwise direction, thus moving the top forwardly to a position in which the levers 32 are as illustrated in Figure 6. It will be appreciated that as the top moves into the position illustrated in Figure 6, the roller 66 enters the gate on the track 68. Thereafter, the top may be slid forwardly and will be guided and supported by the rollers 62 and 66 until the front of the top engages the windshield header bar to which it may be latched as previously suggested. Thereafter, the rear window structure 30 is swung upwardly to its operative raised position illustrated in Figure 1.

The pivot supports 60 for the arms 58 of the levers 32 are located inwardly of the rear quarter windows 22 so that the windows 22 may be raised or lowered with the arms 58 in raised or lowered position.

The foregoing description makes no reference to means for moving the parts and as thus far described it will be appreciated that the rear window structure, the lever arms, and the top may be moved manually as described above. However, it is also possible to effect sequential power actuation of the parts as will be readily understood.

Referring now to Figure 9 there is illustrated a further feature of the present invention. Figure 9 should be compared with Figure 8, in which latter figure the top 28 is shown as in its rearmost fully open position. In Figure 9 the passenger compartment of the vehicle is shown as being provided with a front seat 120 and a rear seat 47. In some cases it may be desirable for the top 28 to be moved to a position in which it overlies and encloses the rear portion of the passenger compartment. This is readily accomplished in the present case by moving the arms 32 to a position in which the roller 62 is in such position that forward movement of the top 28 will bring the forward edges of the top into proximity with the top rear portion of the front seat 120. Obviously of course, the back of the front seat may be provided with structure shaped to interfit with the front edge of the top 28 and may be provided with latch means similar to those provided for connecting the front edge of the top to the windshield header bar.

During forward movement of the top from the position shown in Figure 8 to the alternative position shown in Figure 9, the top is guided by movement of its roller 78 along the track 76 and by movement of the roller 62 along the trackway 68 provided at the edge of the top 28. It will be appreciated that due to the inclination of the sides of the vehicle, the top in the position illustrated in Figure 9, will lie inwardly of the windows 20 and 22 which both therefore may remain in the raised position if desired. Alternatively of course, the window 22 may be moved to its lowered concealed position within the vehicle.

It will be understood that the present construction requires the movable rigid top to be of a length not greater than the length of the rear deck 26 since in the open position the top overlies the rear deck. The actual length of the rigid top is of course determined by the distance between the wind-shield header bar 16 and the forward and upper edge of the rear window structure when the latter is in its raised position. Depending upon the particular body style and design of the vehicle, it may in some cases be desirable to shorten the length of the rigid top by providing a windshield having a header bar located somewhat further to the rear of the vehicle than is conventional. Alternately, in some cases the rear window structure may be modified to extend further forwardly of the vehicle than has heretofore been conventional. In any case, the distance between the windshield header bar and the upper forward edge of the rear window structure shall be such as to require a top having a longitudinal dimension which in its open position will overlie the rear deck of the vehicle and will not extend rearwardly therebeyond.

If desired, suitable shelf means may be provided for spanning the space between the back of the rear seat and the forward edge 48 of the rear deck. This means may be provided as a rearward extension carried by the rear seat and shaped to provide clearance for movement of the rear window structure as illustrated in Figures 10–12. Alternately, a shelf may be provided as a part of the rear window structure and shaped to extend transversely of the vehicle between the lower portions of the rear window frame 52. With the rear window structure in the closed position as illustrated in Figure 10, this shelf would then close the space between the rear seat 47 and the rear deck 26.

The present invention provides a vehicle having the advantages of a rigid or hard top construction which is nevertheless readily convertible to a fully open vehicle by simple movements of relatively few and simple parts. Moreover, movement of the top between its fully open and fully closed position is always adequately supported and adequately guided. Finally, the top in its fully open or fully closed position is firmly locked in place. The use of the levers 32 for guiding and supporting the front edge of the top during completion of its movement toward and from fully open position, while at the same time effecting proper movement of the levers 32 into and out of concealed lowered position contributes substantially to the success of the present construction.

The drawings and the foregoing specification constitute a description of the improved vehicle convertible top in such full, clear, concise and exact terms as to enable any person skilled in the art to practice the invention, the scope of which is indicated by the appended claims.

What we claim as our invention is:

1. A hard top convertible vehicle comprising a body having a passenger compartment and a rear deck extending rearwardly from said passenger compartment, said passenger compartment being enclosed at the front by a windshield having a top header bar, said compartment being selectively enclosed at the sides by windows mounted for raising and lowering movement, said compartment being selectively enclosed at the rear by a rear window structure movable between a raised position and a lowered position in which it is received within said body, said compartment being selectively enclosed at its rear corners by lever devices pivoted within said body and having portions shaped to enclose the spaces between the side windows and rear window structure, and a rigd top slidable along the top edges of said lever devices between a closed position in which the front of said top is adjacent the header bar of said windshield and an intermediate position in which the front edge of said top is located at the forward ends of said lever devices and the rear end of said top rests on said rear deck, said levers being pivoted to swing the front edge of said top upwardly, rearwardly and downwardly to a position directly at the rear of said compartment and to cause rearward movement of the rear edge of said top on said rear deck.

2. A vehicle as defined in claim 1 in which said rear deck is provided with trackways at opposite sides thereof and the rear edge of said top is provided with rollers movable along said trackways.

3. A vehicle as defined in claim 1 comprising latch means on said rear deck engageable with means adjacent the rear edge of said top to retain said top in position overlying said rear deck.

4. A vehicle as defined in claim 1 in which said rear window structure is mounted for movement in trackways, portions of which are carried by said lever devices and portions of which are located in said body.

5. A vehicle as defined in claim 4, said rear window structure being supported entirely on the portions of said trackways located in said body when said rear window structure is in lowered position.

6. A vehicle as defined in claim 1 in which said lever devices have rollers adjacent the front and rear ends of the top edges thereof, and trackways adjacent the sides of said top receiving said rollers.

7. A vehicle as defined in claim 6, the trackways at the sides of said top having gates providing for engagement and disengagement between the rollers at the rear end of the top edges of said lever devices and said last-mentioned trackways when the front edge of said top is located at the front ends of said lever devices and said lever devices are moved into and out of raised position.

8. In a hard top convertible vehicle, a body having a passenger compartment and a rear deck extending rearwardly from said passenger compartment, a pair of hinged levers located adjacent the rear corners of said passenger compartment, said levers being mounted for swinging movement about axes transverse of the vehicle body between a raised position and a lowered position in which they are concealed within the body, said levers in raised position having longitudinally extending top edges, a rigid top, guide means between said top and the top edge of said levers to provide for longitudinal sliding movement of said top along the top edges of said levers, means operable as pivots after predetermined longitudinal movement of said top maintaining pivotal connection of the top to the front end of said levers to provide in sequence upward and rearward and downward movement of the front portion of said top upon movement of said levers to lowered position, and guide means on said deck for guiding the rear edge of said top over said deck.

9. A vehicle as defined in claim 8, wherein the last guide means comprises trackways on said rear deck, and rollers at the rear corners of said top movable along said trackways.

10. A vehicle as defined in claim 8, wherein said levers have rollers adjacent the front and rear ends of their top edges, and trackways along the sides of said top receiving said rollers.

11. In a hard top convertible vehicle comprising a body having a passenger compartment and a rear deck, a pair of rear quarter members pivotally mounted for swinging movement between a raised position and a lowered position in which said members are substantially within said body, said members in raised position having longitudinally extending top edges the forward ends of which are substantially spaced rearwardly from the front of the passenger compartment, a rigid top, means connecting said top to said members for movement longitudinally along the top edges of said members during movement from a closed position of the top to a position partially uncovering said passenger compartment, and said means including elements operable after said longitudinal movement of the top relative to the members providing pivotal connections between the members and the top during movement thereof to a fully open position.

12. Structure as defined in claim 11 in which said top is shaped such that its rear edge engages said rear deck when said top is in an intermediate position.

13. A hard top convertible vehicle comprising a body having a passenger compartment and a rear deck, transversely spaced, longitudinally extending levers pivotally mounted on the body for swinging movement between raised and lowered positions, a rigid top, said levers each having a pair of longitudinally spaced rollers thereon, trackways on said top receiving said rollers providing a support for the top in the raised position thereof, each trackway having a gate therein providing for the escape of the rear rollers on said levers so that they may swing to lowered positions while the front rollers on the levers maintain pivotal connections between the levers and the top during swinging movement of the levers to a lowered position and during lowering of the top to a position on the rear deck.

14. A hard top convertible vehicle comprising a body having a passenger compartment and a rear deck, levers hinged to said body about transversely extending axes located adjacent the rear corners of said compartment, said levers being movable between raised and lowered positions, said levers in raised position having elongated portions which extend longitudinally of the vehicle, rollers adjacent the front and rear ends of said portions, a rigid top having enclosed tracks extending along its sides and receiving said rollers when said levers are in raised position, said top being movable rearwardly of said vehicle from a closed position in guided relation by virtue of the coaction between said rollers and tracks to an intermediate position in which the front edge of said top is adjacent the rollers provided at the front ends of the elongated portions of said levers and the rear end of said top is supported on said rear deck, said tracks having gates therein located at the rollers provided at the rear ends of the elongated portions of said levers when said top is in the aforesaid intermediate position, said gates being operable to release said rollers upon swinging of said levers, said levers being swingable rearwardly and downwardly to move said top to the rear to fully open position in which it overlies said rear deck and said levers are substantially housed within said body.

15. A vehicle as defined in claim 14 in which the rollers at the front end of the elongated portions of said levers remain engaged in said tracks and constitute means for securing the front end of said top against movement when said top is in fully open position.

16. A vehicle as defined in claim 15 and latch means on said rear deck for engaging said top to secure its rear portion against movement when said top is in fully open position.

17. In a convertible automobile body having a rigid top, movable side windows, movable rear quarter windows and a rear window, rear quarter members movable independently of said rear quarter windows pivotally connected to the body and to the top, means operable during swinging of said members to guide said top during movement from a closed to an open position, said members having portions engaging the quarter windows and the rear window when said top is in closed position and bridging the gaps therebetween.

18. In an automobile body according to claim 17, wherein the pivotal connections between the rear quarter members and the body are spaced from the planes of movement of the quarter windows.

19. The combination set forth in claim 17, wherein the pivotal connections between the rear quarter members and the body are disposed inwardly of the planes of movement of the quarter windows.

20. In combination with a vehicle body having a rigid top, a rear deck to the rear of said top and a movable rear window of laterally curved shape, rollers on the lateral end portions of said window, a track adapted to receive said rollers when said window is in its closed position, a second track disposed beneath said rear deck, and said tracks being constructed and arranged such that said second track is adapted to receive said rollers upon movement of said window from closed to open position.

21. The combination set forth in claim 20, wherein said first track is inclined to the vertical and said second track has a substantially horizontal portion whereby said window lies substantially horizontal when in open position.

22. In a convertible automobile body having a passenger compartment provided with front and rear seats, a top mounted on said body and adapted for movement from a raised position covering said passenger compartment to a lowered position in rear of said passenger compartment and vice versa, said top having a forward portion engageable with a windshield header disposed forwardly of said passenger compartment and a rear portion adapted to slideably engage the body rearwardly of the passenger compartment, an actuating arm pivotally mounted on the body intermediate the ends of the passenger compartment and extending upwardly and forwardly of said passenger compartment when the top is in raised position to a combined slideable and pivotal connection with the top, means permitting sliding said top along said connection and means permitting swinging said arm about its mounting on the body.

23. In a convertible automobile body having a passenger compartment provided with front and rear seats, a top mounted on said body and adapted for movement from a raised position covering said passenger compartment to a lowered position in rear of said passenger compartment and vice versa, said top having a forward portion engageable with a windshield header disposed forwardly of said passenger compartment and a rear portion adapted to slideably engage the body rearwardly of the passenger compartment, an actuating arm pivotally mounted on the body intermediate the ends of the passenger compartment and extending upwardly of said passenger compartment when the top is in raised position and forwardly to a connection with the top, and means permitting sliding said top rearwardly on said connection.

24. In a convertible automobile body having a passenger compartment provided with front and rear seats, a top mounted on said body and adapted for movement from a raised position covering said passenger compartment to a lowered position in rear of said passenger compartment and vice versa, said top having a forward portion engageable with a windshield header disposed forwardly of said passenger compartment and a rear portion adapted to slideably engage the body rearwardly of the passenger compartment, an actuating arm pivotally mounted on the body intermediate the ends of the passenger compartment and extending upwardly of said passenger compartment when the top is in raised position and forwardly to a connection with the top, means permitting sliding said top on said connection while said arm is upright and means permitting swinging said arm about its pivot on the body thereby to swing the forward portion of said top in an arc.

References Cited in the file of this patent

UNITED STATES PATENTS

| | | |
|---|---|---|
| 1,348,593 | Spiegel | Aug. 3, 1920 |
| 1,940,444 | Burgman | Dec. 19, 1933 |
| 2,575,864 | Croucher | Nov. 20, 1951 |
| 2,623,779 | Catell | Dec. 30, 1952 |
| 2,747,923 | McLean | May 29, 1956 |

FOREIGN PATENTS

| | | |
|---|---|---|
| 808,881 | France | Feb. 17, 1937 |
| 420,866 | Great Britain | Dec. 10, 1934 |
| 448,042 | Great Britain | May 29, 1936 |